Patented Apr. 16, 1940

2,197,517

UNITED STATES PATENT OFFICE 2,197,517

PROCESS OF MAKING VINEGAR FROM DEXTROSE

Rolland F. Cohee, Jr., Ames, Iowa, assignor to Corn Products Refining Company, New York, N. Y., a corporation of New Jersey No Drawing. Application September 19, 1938, Serial No. 230,616

6 Claims. (Cl. 99—147)

This invention relates to the production of vinegar from dextrose.

Vinegar has ordinarily been made from apple or grape juices which contain dextrose and other fermentable sugars. The operation involves, ordinarily, first, the action of micro-organisms, ordinarily yeasts, which convert the fermentable sugars into alcohol and carbon dioxide; and, second, the action of distinctly different micro-organisms, ordinarily bacteria, which convert the alcohol into acetic acid. The quality and character of the vinegar, that is to say, its taste, aroma, color and clarity depend, in large measure at least, on the first, that is, the alcoholic fermentation, and upon, of course, the character and properties of the raw material used in this step of the vinegar making process. Efforts have been made heretofore to produce satisfactory vinegars from dextrose, from dextrose containing materials other than fruit juices, and from sugars convertible into dextrose. Such attempts have not been successful, mainly, it is believed, because the raw materials used and the alcoholic fermentations employed were of such character that the desired qualities in the vinegar of taste, aroma, color, and clarity were not successfully developed.

The present invention provides a convenient and economical method whereby dextrose, that is, high purity crystalline dextrose such as hydrate dextrose, may be given an alcoholic fermentation for the production of an alcohol containing liquor from which may be produced, by the usual or any suitable acetic acid fermentation procedures, a vinegar of satisfactory character having in view the requirements above noted.

Certain conditions appear to be necessary in order to produce from dextrose a vinegar which will be in all substantial respects a satisfactory, merchantable product and in order that the process may give satisfactory yields. These conditions are:

(1) Substantially pure dextrose should be used. The dextrose should be at least 98% pure and preferably should have a purity of 99.5% or higher. Thus, pressed corn sugar of 92%–95% purity, (87% dextrose, balance impurities and water) failed to give a satisfactory alcohol yield (5.9% alcohol, by weight, as against 6.6% where high purity dextrose was used) and the color and flavor of the vinegar were unsatisfactory. Hydrol (dextrose mother liquor) and corn sugar (corn sugar containing all of the impurities of the mother liquor) were tried with less satisfactory results.

(2) The dextrose should be in the form of a water solution having a dextrose content of 14%–16%, the preferred concentration being 15.2%. Such solution will give a 6.6% alcohol yield, assuming that the other conditions are as specified herein.

(3) Bakers' yeasts, yeasts known as such on the market, may be used for the alcoholic fermentation with excellent results. However, a particular type of bakers' yeast known as *Saccharomyces cerevisiae*, Frohberg, gives perhaps better results when used in pure cultures than the known commercial bakers' yeasts. The amount of yeast is 1 to 3 pounds per 100 gallons of dextrose solution, preferably 2 pounds per 100 gallons of 15.2% dextrose solution. The yeast fermentation temperature should be between 75° and 90° F., preferably 86° F.

(4) The best yeast food for the yeasts mentioned under (3) is an extract of barley sprouts. Barley sprouts are a by-product of the manufacture of malt. Malt is made by subjecting barley to germinating conditions. Upon proper germination the barley seeds sprout; and when the sprouts have developed to a certain length, the seeds are cut off from the sprouts, and dried and ground. The stems left behind are referred to as barley sprouts. In preparing the extract, the sprouts are macerated with water at a temperature between 135° and 155° F., preferably 140° F. The temperature, that is, is high enough to extract the nutrient material but not high enough to coagulate the soluble protein in such material. The amount of sprouts used for making the extract is from ½% to 3%, of the water used for making the dextrose solution, preferably 2% of the weight of water used for making a 15.2% dextrose solution.

(5) 1 to 3 gallons of vinegar, preferably 1½ gallons, containing 10% of acetic acid, is added to the dextrose solution.

The following is a specific example of the reduction of the invention to practice. It will be understood that this example is to be taken as merely typical and informative. The invention is not limited to the particulars therein shown. The intention is to cover by patent all equivalents and also all modifications within the scope of the appended claims.

*Example.*—For production of 100 gallons of 6.6% alcoholic solution, capable of yielding a 6% acetic acid vinegar of proper color, clarity, taste and aroma when subjected to the usual acetic fermentation, the following procedures are employed:

(a) 16.6 pounds of barley sprouts contained in a canvas bag are immersed in a tank containing 40 gallons of water which is maintained at a temperature of 140° F. for thirty minutes with compressed air agitation in the neighborhood of the bag. 40 gallons of barley sprout extract is drawn off and diluted with 60 gallons of water (b) 125 pounds of high purity dextrose is dissolved in the 100 gallons of dilute barley sprout water giving a dextrose solution having a dextrose content of 15.2%.

(c) 10 gallons of this solution is sterilized by heat and cooled to 86° F. 2 pounds of bakers' yeast is added and the material allowed to ferment for 18 to 20 hours at the temperature of 86° F.

(d) The remaining 90 gallons of 15.2% dextrose solution made under (b) is heated to 86° F. and 1½ gallons of vinegar containing 10% acetic acid is added. Thereafter there is added the 10 gallons of fermented liquor made under (c) and the mixture allowed to ferment for 48 hours. At this time the reaction will be complete as indicated by the cessation of carbon dioxide formation.

(e) The resulting alcohol solution is filtered to remove yeast and sediment.

(f) This solution may be subjected at once to the customary, or any suitable, acetic acid fermentation; or it may be stored for future use, in which later case, it will be mixed with vinegar according to customary practice.

In the specification and claims percentages are given on the basis of weight unless otherwise specified.

I claim:

1. Process of making vinegar from dextrose which comprises producing an alcohol containing liquor suitable for converting into vinegar by acetic acid fermentation which process comprises: fermenting a 14%–16% solution of high purity dextrose with bakers' yeast, using an extract of barley sprouts as yeast food, adding to the solution undergoing fermentation 10% acetic acid vinegar in proportion of 1–3 gallons of vinegar to 100 gallons of dextrose solution and acetifying the fermented solution.

2. Process of making vinegar from dextrose which comprises producing an alcohol containing liquor suitable for converting into vinegar by acetic acid fermentation which process comprises: fermenting a 14%–16% solution of high purity dextrose with the yeast Saccharomyces cerevisiae, Frohberg, using as a yeast food an extract of barley sprouts, extracted at 135°–155° F., in quantity ½% to 3% based on the water used to make the dextrose solution and acetifying the fermented solution.

3. Process of making vinegar from dextrose which comprises producing an alcohol containing liquor suitable for converting into vinegar by acetic acid fermentation which process comprises: fermenting a 14%–16% solution of high purity dextrose with bakers' yeast, using as yeast food an extract of ½% to 3% of barley sprouts based on the water used to make the solution, adding to the solution undergoing fermentation 10% acetic acid vinegar in the proportion of 1–3 gallons of vinegar to 100 gallons of dextrose solution and acetifying the fermented solution.

4. Process of making vinegar from dextrose which comprises producing an alcohol containing liquor suitable for converting into vinegar by acetic acid fermentation which process comprises: fermenting at 75°–90° F. a 14%–16% solution of high purity dextrose with bakers' yeast, using as yeast food an extract of ½% to 3% of barley sprouts, based on the water used to make the solution, adding to the liquor undergoing fermentation 10% acetic acid vinegar in the proportion of 1–3 gallons of vinegar to 100 gallons of dextrose solution and acetifying the fermented solution.

5. Process of making vinegar from dextrose which comprises producing an alcohol containing liquor suitable for converting into vinegar by acetic acid fermentation which process comprises: fermenting at about 86° F. a solution of pure dextrose having a dextrose content of about 15.2% with bakers' yeast, using as yeast food an extract of 2% of barley sprouts, based upon the water used to make the dextrose solution, adding to the liquor undergoing fermentation 10% acetic acid vinegar in the proportion of 1½ gallons of vinegar to 100 gallons of dextrose solution and acetifying the fermented solution.

6. Process of making vinegar from dextrose which comprises producing an alcohol containing liquor suitable for converting into vinegar by acetic acid fermentation which process comprises: extracting at 140° F. 16.6 pounds of barley sprouts with water and diluting the extract with water to produce 100 gallons of barley sprout extract; dissolving 125 pounds of high purity dextrose in the dilute extract; sterilizing by heat a portion of said solution, cooling to about 86° F., adding thereto 2 pounds of bakers' yeast and fermenting the liquor at about 86° F. for 18–20 hours; heating the remaining portion of the dextrose solution to a temperature of about 86° F., adding 1½ gallons of vinegar containing 10% acetic acid, fermenting this liquor together with the liquor containing the bakers' yeast for about 48 hours and acetifying the fermented solution.

ROLLAND F. COHEE, Jr.